(12) United States Patent
Kojovic et al.

(10) Patent No.: US 7,712,313 B2
(45) Date of Patent: May 11, 2010

(54) FUEL NOZZLE FOR A GAS TURBINE ENGINE

(75) Inventors: Aleksandar Kojovic, Oakville (CA); Lev Alexander Prociw, Elmira (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 139 days.

(21) Appl. No.: 11/843,236

(22) Filed: Aug. 22, 2007

(65) Prior Publication Data

US 2009/0050714 A1 Feb. 26, 2009

(51) Int. Cl.
F02C 1/00 (2006.01)
(52) U.S. Cl. .......................... 60/740; 60/748
(58) Field of Classification Search ........... 60/74–742, 60/746–748, 806, 39.85; 239/404, 405
See application file for complete search history.

(56) References Cited

U.S. PATENT DOCUMENTS

| | | | |
|---|---|---|---|
| 1,398,650 A * | 11/1921 | Rothwell | 239/402.5 |
| 1,564,064 A | 12/1925 | Hannah | |
| 1,713,357 A * | 5/1929 | St Clair | 239/464 |
| 3,337,135 A | 8/1967 | Blakely et al. | |
| 3,945,574 A | 3/1976 | Polnauer et al. | |
| 4,013,395 A | 3/1977 | Wormser | |
| 4,014,469 A | 3/1977 | Sato | |
| 4,133,485 A | 1/1979 | Bouvin | |
| 4,155,220 A | 5/1979 | Emory | |
| 4,258,544 A | 3/1981 | Gebhart et al. | |
| 4,366,860 A * | 1/1983 | Donaldson et al. | 166/59 |
| 4,454,711 A | 6/1984 | Ben-Porat | |
| 4,464,314 A | 8/1984 | Surovikin et al. | |
| 4,491,272 A | 1/1985 | Bradley et al. | |
| 4,648,835 A * | 3/1987 | Eisenhawer et al. | 431/4 |
| 4,797,089 A * | 1/1989 | Schubach et al. | 431/28 |
| 5,067,655 A | 11/1991 | Farago et al. | |
| 5,423,173 A | 6/1995 | Lemon et al. | |
| 5,660,039 A | 8/1997 | Sion et al. | |
| 5,882,514 A * | 3/1999 | Fletcher | 210/223 |
| 6,021,635 A | 2/2000 | Gaag et al. | |
| 6,029,910 A | 2/2000 | Joshi et al. | |
| 6,082,113 A | 7/2000 | Prociw et al. | |
| 6,119,459 A | 9/2000 | Gomez et al. | |
| 6,247,317 B1 | 6/2001 | Kostka | |
| 6,276,141 B1 * | 8/2001 | Pelletier | 60/740 |
| 6,349,886 B1 | 2/2002 | Bouti | |
| 6,431,467 B1 | 8/2002 | Joshi et al. | |
| 6,539,724 B2 | 4/2003 | Cornwell et al. | |
| 6,718,770 B2 * | 4/2004 | Laing et al. | 60/740 |
| 6,883,332 B2 | 4/2005 | Steinthorsson et al. | |
| 7,043,922 B2 * | 5/2006 | Thompson et al. | 60/772 |
| 7,174,717 B2 | 2/2007 | Prociw | |
| 2005/0144952 A1* | 7/2005 | Prociw | 60/740 |
| 2007/0044477 A1 | 3/2007 | Held et al. | |

* cited by examiner

Primary Examiner—Michael Cuff
Assistant Examiner—Phutthiwat Wongwian
(74) Attorney, Agent, or Firm—Ogilvy Renault LLP

(57) ABSTRACT

In the fuel nozzle, the fuel is circulated in a helical path around the interface of a stem of the fuel nozzle and a flange for increase the cooling.

13 Claims, 3 Drawing Sheets

– 1 –
FUEL NOZZLE FOR A GAS TURBINE ENGINE

TECHNICAL FIELD

The technical field generally relates to fuel nozzles for use in gas turbine engines. It also generally relates to a method of cooling fuel nozzles for gas turbine engines.

BACKGROUND

In a gas turbine engine, fuel burns within the combustor to generate heat so as to provide energy to the turbine section of the engine. The generated heat being very intense, some of it tends to spread to parts surrounding the combustor, such as the fuel nozzles. A number of these fuel nozzles is provided around the combustor to supply fuel. Oftentimes, fuel flowing in the fuel nozzles remove some of the heat therein and prevent their temperature from rising during a high power operation. However, when the flow of fuel is reduced after a high power operation, such as during a descent of an aircraft, the internal temperature of the entire fuel nozzles may increase. Accordingly, O-rings provided at the inlet of the fuel nozzles are made of a material capable of withstanding these high temperatures. High-temperature O-rings, however, are significantly more costly than O-rings made of rubber or other materials with a lower thermal resistance. Given the number of fuel nozzles in a gas turbine engine and the number of O-rings that must be used at each fuel nozzle inlet, room for improvements in fuel nozzle designs exists.

SUMMARY

In one aspect, the present concept provides a fuel nozzle comprising: a flange having an inlet and an outlet; and a stem having an inlet and an outlet, the inlet of the stem being connected to the outlet of the flange by an intermediary fuel circuit including a helical fuel path between the outlet of the flange and the inlet of the stem.

In another aspect, the present concept provides a fuel nozzle for a gas turbine engine, the fuel nozzle including a flange and a stem, the flange having an internal fuel circuit comprising an outlet, the stem having an internal fuel circuit comprising an inlet, the outlet of the internal fuel circuit of the flange being in fluid communication with the inlet of the internal fuel circuit of the stem through at least an intermediary helical groove in which fuel circulates as a coolant.

In a further aspect, the present concept provides a method of cooling a flange of a fuel nozzle in a gas turbine engine, the fuel nozzle having a stem connected to an outlet port of the flange, the method comprising: circulating the fuel in the flange; circulating the fuel in a helical path between the outlet port of the flange and an outer surface of the stem, the fuel being used as a coolant; and then channelling the fuel into the stem.

Further details of these and other aspects of the improvements will be apparent from the detailed description and figures included below.

DESCRIPTION OF THE FIGURES

Reference is now made to the accompanying figures depicting aspects of the improved design, in which.

DETAILED DESCRIPTION

Figure 1:
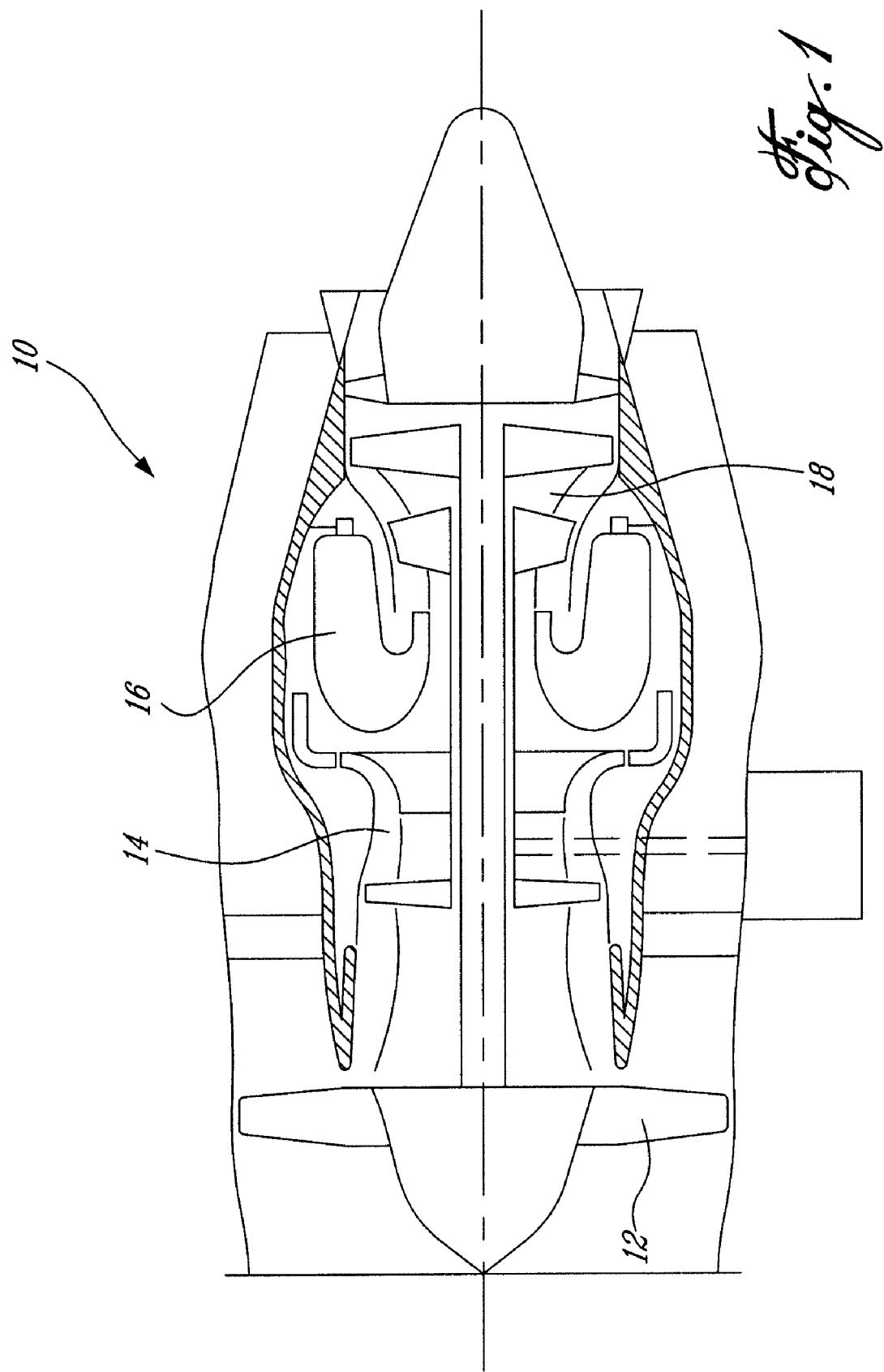
FIG. 1 schematically shows a generic gas turbine engine to illustrate an example of a general environment in which the improved fuel nozzle and method can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. This figure illustrates an example of the environment in which the improved fuel nozzle and method can be used.

Figure 2:
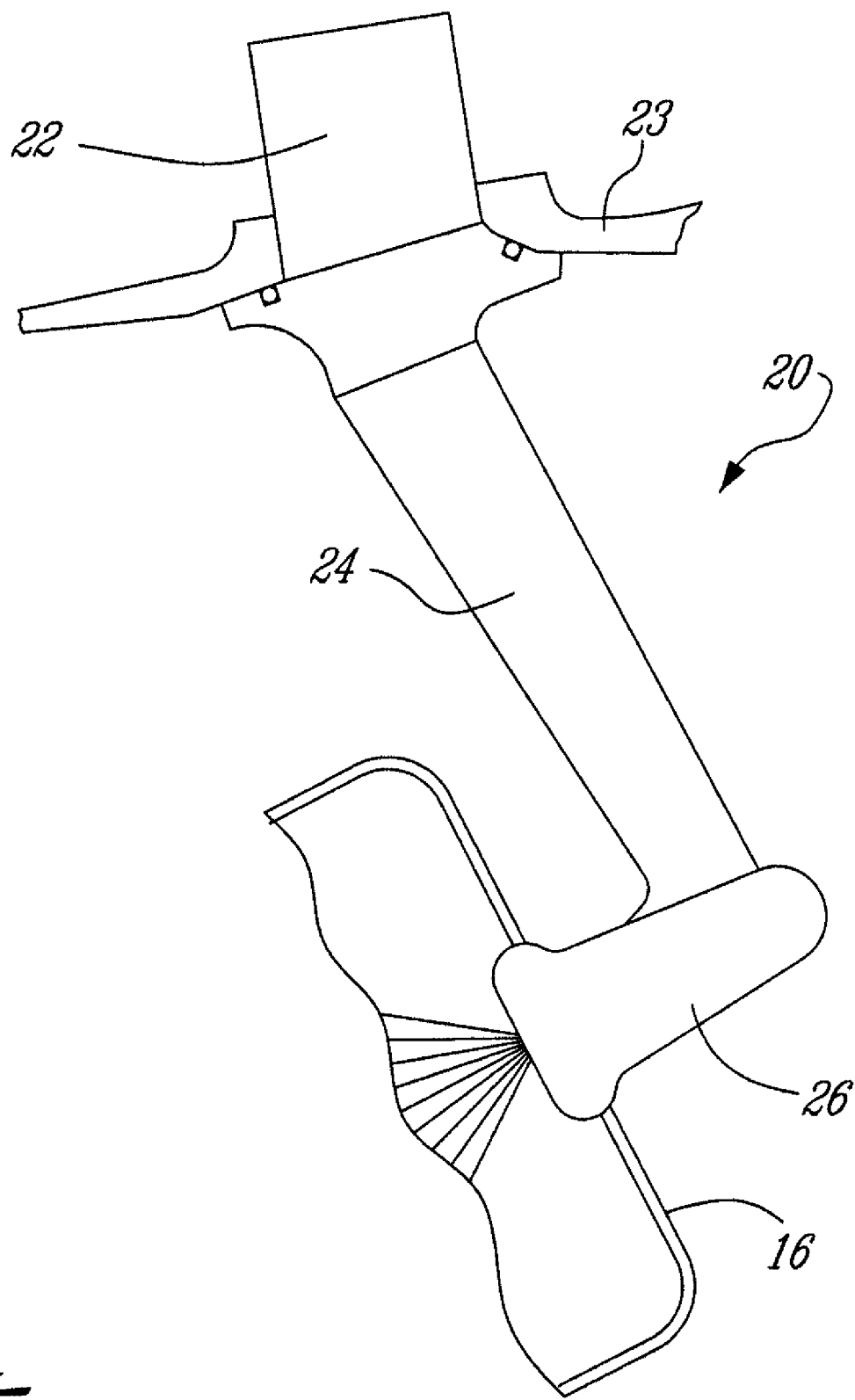
FIG. 2 is a schematic side view of a fuel nozzle.

FIG. 2 shows an example of a generic fuel nozzle 20. The illustrated fuel nozzle 20 comprises three parts brazed together, namely a flange 22 which is secured to the engine case 23, a stem 24, extending from the flange 22, and a fuel nozzle tip 26 located at the end of the stem 24 and having a portion connected to the combustor 16. Fuel is supplied at the flange 22 of the fuel nozzle 20 from a manifold (not shown). The flange 22 is removably connected to a male connector (not shown) of the manifold. The fuel exits the fuel nozzle 20 at its tip 26, where it is ejected in the combustor 16 and ignited to generate heat.

Figure 3:
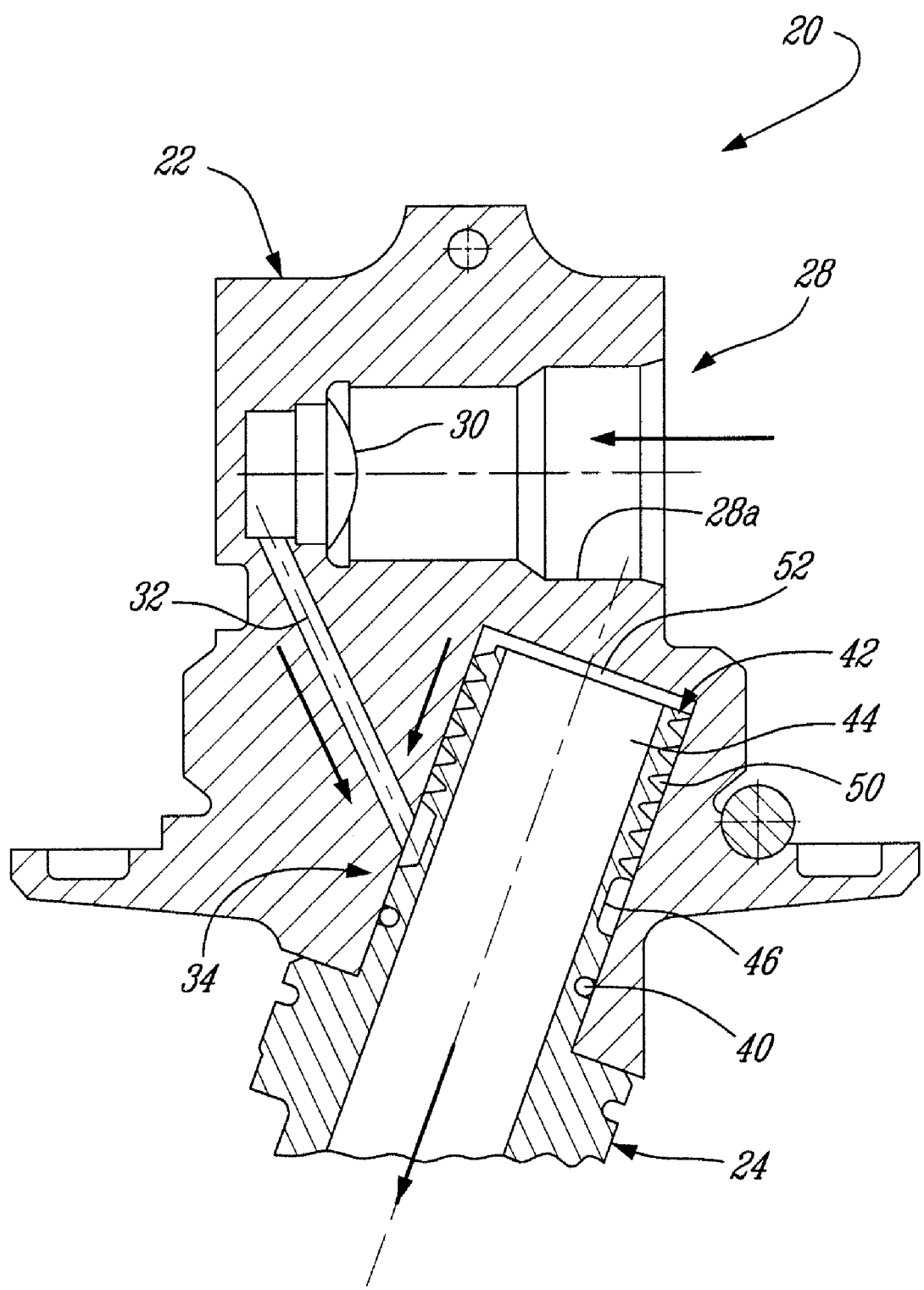
FIG. 3 is a schematic cross-sectional view of an example of an improved fuel nozzle.

FIG. 3 shows an example of an improved fuel nozzle 20. It also shows the flange 22 of the fuel nozzle 20 in more details. As can be seen, the flange 22 includes an internal fuel circuit. Fuel circulates in the fuel circuit following the first two arrows. The internal fuel circuit of the flange 22 comprises an inlet port 28 configured and disposed to receive the end of the male connector of the manifold in a locking and sealing engagement. The internal wall 28a of the inlet port 28 has shoulders designed as seats for O-rings mounted on the male connector. The inlet port 28 also has an optional strainer 30 near the bottom of the inlet port 28. FIG. 3 also shows the brazed joint 40 which seals the flange 22 and the stem 24 together.

The bottom of the inlet port 28 is in fluid communication with an internal channel 32 made within the body of the flange 22. The channel 32 creates a passage from the bottom of the inlet port 28 to a side location on an outlet port 34 of the flange 22. The outlet port 34 is configured and disposed to receive an inlet 44 of the stem 24. Fuel can then be transferred from the flange 22 to an internal fuel circuit of the stem 24.

In the illustrated example, the internal channel 32 in the flange 22 ends at a location distal from the end 42 of the stem 24, which location corresponds approximately to the middle of the outlet port 34 of the flange 22. An annular groove 46 is provided in the outer wall of the inlet 44 of the stem 24, in registry with the end of the channel 32. From there, the fuel is sent toward the opened end 42 of the stem 24 by following a helical groove 50 made in the outer wall of the inlet 44 of the stem 24. The annular groove 46 and the helical groove 50 define one example of an intermediary fuel circuit. The helical groove 50 has several turns around the stem 24 and ends at a location proximal to the end 42 of the stem 24. A small space 52 is provided between the bottom of the outlet port 34 and the end 42, thereby allowing the fuel to easily reach the internal fuel circuit within the stem 24.

In use, the inlet port 28 receives fuel from the manifold. Fuel is sent into the internal channel 32 of the flange 22 and then to the annular groove 46. From there, it follows the helical groove 50 at the side surface of the inlet 44 of the stem 24. The fuel circulates in a helical path, thereby cooling the mutual interface between the flange 22 and the stem 24 since the fuel has a temperature significantly lower than these parts during the operation of the engine 10. With this design, cooling is always provided, even if the fuel flow is reduced, because fuel circulates in a helical path all around the interface of the flange 22 and the stem 24. This allows using low-cost O-rings at the male connector fitting into the inlet port 28 of the flange 22, which O-rings are significantly more economical than the ones designed for high temperatures, since the fuel in the helical groove 50 can keep the internal temperature well under their melting temperature.

The above description is meant to be exemplary only, and one skilled in the art will recognize that changes may be made without departing from the scope of claims. For example, the helical groove can be machined within the inner surface of the outlet port instead of being machined on the stem. The same also applies to the annular groove, which can be located between the end of the channel in the body of the flange and the helical groove. Yet, the annular groove is optional since the fuel can enter the helical groove directly from the channel. The shape of the flange, the stem and the tip can be different than that shown in the figures. More than one helical groove can be provided in a parallel fashion. The spacing between the tip of the stem and the bottom of the outlet port of the flange can be replaced by one or more transversal openings made through the inlet of the stem. The number of turns of the helical groove may vary from one design to another. Still other modifications will be apparent to those skilled in the art, in light of a review of this disclosure, and such modifications are intended to fall within the appended claims.

What is claimed is:

1. A fuel nozzle comprising:
a flange having an inlet and an outlet; and a stem having an internal fuel circuit within an interior of the stem with an inlet and an outlet, with fuel circulating in the internal fuel circuit from the inlet to the outlet of the stem, the inlet of the stem being connected to the outlet of the flange by an intermediary fuel circuit including a helical fuel path between the outlet of the flange and the inlet of the stem, the helical fuel path having a helical groove provided on an outer surface of the stem, between the inlet and the outlet of the stem with the outlet of the flange distally located from the inlet of the stem along the stem.

2. The fuel nozzle as defined in claim 1, wherein the helical groove comprises several turns around the stem.

3. The fuel nozzle as defined in claim 1, wherein the inlet of the stem is located at an opened tip thereof.

4. The fuel nozzle as defined in claim 1, wherein the intermediary fuel circuit includes an annular space located around the stem and adjacent the outlet of the flange.

5. The fuel nozzle as defined in claim 4, wherein the annular space is created by an annular groove provided on an outer surface of the stem.

6. A fuel nozzle for a gas turbine engine, the fuel nozzle including a flange and a stem, the flange having an internal fuel circuit comprising an outlet, the stem having an internal fuel circuit within an interior of the stem and comprising an inlet and an outlet, the outlet of the internal fuel circuit of the flange being in fluid communication with the inlet of the internal fuel circuit of the stem through at least an intermediary helical groove in which fuel circulates as a coolant, the helical groove being provided on an outer surface of the stem, the outlet of the flange being located distally from the inlet of the stem and between the inlet and the outlet of the stem.

7. The fuel nozzle as defined in claim 6, wherein the helical groove comprises several turns around the stem.

8. The fuel nozzle as defined in claim 6, wherein the fuel enters into the internal fuel circuit of the stem through an opened tip of the stem.

9. The fuel nozzle as defined in claim 6, wherein the outlet of the internal fuel circuit of the flange and the helical groove are connected together through an annular groove.

10. The fuel nozzle as defined in claim 9, wherein the annular groove is provided on the outer surface of the stem.

11. The fuel nozzle as defined in claim 6, wherein the helical groove is machined in an outer surface of an inlet of the stem.

12. The fuel nozzle as defined in claim 10, wherein the annular groove is machined on the stem.

13. The fuel nozzle as defined in claim 6, wherein the flange and the stem are brazed together.

* * * * *